(12) United States Patent
Doyle et al.

(10) Patent No.: US 11,201,414 B2
(45) Date of Patent: Dec. 14, 2021

(54) WAVEGUIDE SENSOR ASSEMBLIES AND RELATED METHODS

(71) Applicant: Veoneer US, Inc., Southfield, MI (US)

(72) Inventors: Scott B. Doyle, Sudbury, MA (US); Robert J. Sletten, Bow, NH (US); Angelos Alexanian, Lexington, MA (US)

(73) Assignee: Veoneer US, Inc., Southfield, MI (US)

( * ) Notice: Subject to any disclaimer, the term of this patent is extended or adjusted under 35 U.S.C. 154(b) by 128 days.

(21) Appl. No.: 16/224,647

(22) Filed: Dec. 18, 2018

(65) Prior Publication Data

US 2020/0194900 A1 Jun. 18, 2020

(51) Int. Cl.
*H01Q 21/00* (2006.01)
*H01Q 1/32* (2006.01)
(Continued)

(52) U.S. Cl.
CPC ......... *H01Q 21/005* (2013.01); *G01S 13/931* (2013.01); *H01Q 1/3233* (2013.01); *H01Q 13/10* (2013.01); *H01Q 21/064* (2013.01)

(58) Field of Classification Search
CPC ........ H01Q 1/3233; H01Q 1/42; H01Q 13/10; H01Q 21/005; H01Q 21/0043; H01Q 21/0062; H01Q 21/064; H01Q 21/0006; H01Q 21/0037; H01Q 21/06; H01Q 21/061; H01Q 21/08; H01Q 21/10; H01Q 21/12; H01Q 21/22; H01Q 21/225; H01Q 21/245; H01Q 21/29; H01Q 21/293; H01Q 1/28–3291; H01Q 1/422; H01Q 1/424; H01Q 13/103; H01Q 13/106; H01Q 13/18; G01S 13/931; G01S 2013/0236;
(Continued)

(56) References Cited

U.S. PATENT DOCUMENTS

| 4,517,571 A | 5/1985 | Mulliner et al. |
| 8,446,313 B2 * | 5/2013 | Miyagawa ............. H01Q 13/22 342/175 |

(Continued)

FOREIGN PATENT DOCUMENTS

| EP | 2343774 | 7/2011 |
| EP | 2677594 | 12/2013 |

(Continued)

OTHER PUBLICATIONS

Jan. 27, 2020 PCT/US19/050478 International Search Report (2 pgs).
(Continued)

*Primary Examiner* — Dimary S Lopez Cruz
*Assistant Examiner* — Patrick R Holecek
(74) *Attorney, Agent, or Firm* — Matthew D. Thayne; Thayne and Davis LLC

(57) ABSTRACT

Antenna assemblies for vehicles, such as RADAR sensor antenna assemblies. In some embodiments, the assembly may comprise an antenna block defining an array of waveguide grooves on a first side of the antenna block. A slotted layer comprising a plurality of slots may be coupled with the antenna block with the slots at least partially aligned with the waveguide grooves of the antenna block. An adhesive layer may be positioned in between the antenna block and the slotted layer.

7 Claims, 7 Drawing Sheets

(51) Int. Cl.
  *H01Q 13/10* (2006.01)
  *H01Q 21/06* (2006.01)
  *G01S 13/931* (2020.01)

(58) Field of Classification Search
  CPC ..... G01S 2013/0245; G01S 2013/0254; G01S 2013/0263; G01S 2013/9314; G01S 2013/9316; G01S 2013/9327; G01S 2013/93271; G01S 2013/93272; G01S 2013/93274; G01S 2013/93275; G01S 2013/93276; G01S 2013/93277; G01S 13/02; G01S 13/0209; G01S 13/04; G01S 13/06; G01S 13/08; G01S 13/32; G01S 13/42; G01S 13/44; G01S 13/4454; G01S 13/4463; G01S 13/46; G01S 13/48; G01S 13/50; G01S 13/505; G01S 13/52; G01S 13/534; G01S 13/88; G01S 13/93; G01S 2007/027; G01S 7/032; G01S 7/2813; G01S 7/4808; G01S 7/481; G01S 7/4813
  See application file for complete search history.

(56) References Cited

U.S. PATENT DOCUMENTS

| | | | | |
|---|---|---|---|---|
| 8,779,995 | B2* | 7/2014 | Kirino | H01Q 1/3291 343/713 |
| 9,806,431 | B1* | 10/2017 | Izadian | H01Q 13/10 |
| 9,997,842 | B2 | 6/2018 | Kirino et al. | |
| 2014/0111392 | A1 | 4/2014 | Ou | |
| 2015/0222021 | A1 | 6/2015 | Stevenson et al. | |
| 2015/0222023 | A1 | 8/2015 | Shijo et al. | |
| 2017/0187121 | A1 | 6/2017 | Kirino et al. | |
| 2017/0187124 | A1 | 6/2017 | Kirino et al. | |
| 2017/0237177 | A1 | 8/2017 | Kirino et al. | |
| 2018/0013208 | A1 | 1/2018 | Izadian et al. | |
| 2018/0034143 | A1* | 2/2018 | Nishikawa | H01Q 1/42 |

FOREIGN PATENT DOCUMENTS

| | | |
|---|---|---|
| EP | 2862227 | 4/2015 |
| EP | 2945222 | 11/2015 |
| EP | 3147994 | 3/2017 |
| IN | 201717024455 | 10/2017 |
| WO | 2010003808 | 1/2010 |
| WO | 2013185807 | 12/2013 |
| WO | 2013189919 | 12/2013 |
| WO | 2014090290 | 6/2014 |
| WO | 2015172948 | 11/2015 |
| WO | 201658627 | 4/2016 |
| WO | 2016116126 | 7/2016 |
| WO | 2017078183 | 5/2017 |
| WO | 2018021244 A1 | 1/2018 |
| WO | 201867046 | 4/2018 |

OTHER PUBLICATIONS

Jan. 27, 2020 PCT/US19/050478 Written Opinion (8 pgs).
WO2018021244A1, Jan. 2, 2018, Denso Corporation, Machine Translation, (12 pgs).

* cited by examiner

WAVEGUIDE SENSOR ASSEMBLIES AND RELATED METHODS

SUMMARY

Disclosed herein are various embodiments of sensor assemblies and related elements, sub-assemblies, and manufacturing methods. In preferred embodiments and implementations, such assemblies may comprise RADAR sensor modules for vehicles, including one or more novel and inventive features.

For example, in some embodiments disclosed herein, an antenna block, which may comprise a casting, may have features designed to establish the foundation for one or more waveguides and may provide the primary support structure for various means for coupling the sensor assembly to a vehicle. For example, an array of one or more waveguide grooves may be formed, in some cases with waveguide ridges formed therein. A film or other layer, such as a conductive adhesive layer, may be used to couple a conductive sheet comprising antenna slots to the block. A top layer that may comprise an adhesive plastic film in some embodiments, may form a radome or weather seal to the assembly.

In some embodiments, a cover may be coupled to the block/casting, such as by crimping a frame to a recess formed in the block/casting and/or over-molding the cover with a potting material, sealant, and/or other suitable material to provide a suitable seal.

In a more particular example of a vehicle RADAR module according to some embodiments, the assembly may comprise an antenna block defining a first array of waveguide grooves on a first side of the antenna block. The assembly may further comprise a slotted layer comprising a plurality of slots that may be at least partially aligned with the waveguide grooves of the antenna block. In some embodiments, the slots may be fully aligned with the waveguide grooves. An adhesive layer may be positioned in between the antenna block and the slotted layer. A cover may be coupled to the antenna block such that at least a portion of the antenna block is recessed within the cover. In some embodiments, a lower portion of the antenna block may be recessed within the cover and an upper portion may protrude above the cover. One or more mounting tabs configured for mounting the vehicle RADAR module to a vehicle may be provided. In some embodiments, the one or more mounting tabs may be an integral part of the antenna block, which may comprise a casting.

In some embodiments, the array of waveguide grooves may be formed by providing a plurality of adjacent posts that collectively define one or more such grooves. Alternatively, the grooves may be formed by simply forming one or more trenches within a surface of the antenna block. Some embodiments may further comprise a second array of waveguide grooves positioned on a second side of the antenna block opposite the first side.

In some embodiments, the at least one mounting tab may protrude beyond a perimeter of the cover. For example, the cover may be molded or otherwise formed below the at least one mounting tab. Alternatively, the cover may comprise an opening through which the at least one mounting tab may extend so as to protrude beyond the perimeter of the cover.

In some embodiments, the at least one mounting tab may comprise a mounting feature configured to engage a corresponding mounting feature on a vehicle, such as a fastener opening, a snap-fit prong, a snap-fit groove, a mounting bracket, and/or a mounting post.

In some embodiments, the antenna block may comprise a recess, such as an annular recess. In some such embodiments and in related implementations of manufacturing methods, the cover may comprise a rim engaged within the recess to affix the cover to the antenna block. In some such embodiments and implementations, the cover may be crimped to the antenna block at the recess so as to form the rim therein.

Some embodiments may further comprise a plurality of ridges extending within the waveguide grooves. In some such embodiments, each of the waveguide grooves comprises a corresponding ridge formed therein.

In an example of a vehicle sensor antenna assembly according to other embodiments, the assembly may comprise an antenna block defining an array of waveguide grooves on a first side of the antenna block. A slotted layer, such as a conductive metal or other sheet, comprising a plurality of slots may be adhered or otherwise coupled to the antenna block, in some embodiments with the slots at least partially aligned with the waveguide grooves of the antenna block (in some embodiments, the slots are fully aligned with the waveguide grooves such that the entire grooves are left unexposed by the slots). An adhesive layer may be positioned in between the antenna block and the slotted layer, which may be used to adhere the slotted layer to the antenna block. The adhesive layer may comprise, for example, an adhesive tape (preferably conductive) or a solder layer.

In some embodiments, the antenna block may further comprise a second array of waveguide grooves, which in some embodiments may be separate from the grooves on the first side and/or spaced apart from the first side. In some such embodiments, the second array of waveguide grooves is positioned on a second side of the antenna block opposite from the first side. One or more (in some embodiments, each) of the waveguide grooves on the array may at least partially overlap with a corresponding waveguide groove of the second array. In some such embodiments, the two arrays of waveguide grooves may be fully aligned such that each groove on one surface/side has a corresponding groove on the opposite surface/side that is at the same position along two dimensions relative to the opposite groove.

Some embodiments may further comprise a printed circuit board. In some such embodiments, a second adhesive layer may be positioned between the printed circuit board and the second array of waveguide grooves on the antenna block.

In an example of a method for manufacturing a vehicle sensor module according to some implementations, the method may comprise adhering a first conductive adhesive layer to a first side of an antenna block, such as a casting. The antenna block may comprise a plurality of waveguide grooves, which may be defined by, for example, a series of posts or by one or more trenches formed in the antenna block. A slotted layer comprising a plurality of slots may be coupled to the antenna block adjacent to the plurality of waveguide grooves. In some implementations, the slotted layer may be coupled to the antenna block using an adhesive layer, such as preferably a conductive adhesive layer, which conductive adhesive layer may also comprise slots at least partially aligned with the slots of the slotted layer. In some implementations, the slotted layer may be coupled to the antenna block such that one or more (in some such implementations, all) of the waveguide grooves is at least partially, or in some such embodiments, fully, aligned with the slots formed in the slotted layer.

A cover may be coupled to the antenna block such that a second side of the antenna block opposite the first side is recessed within the cover. In some implementations, the cover may be coupled to the antenna block by crimping at least a portion of the cover, such as a frame of the cover, to the antenna block. For example, in some implementations, the antenna block may comprise a recess, and the cover may be crimped to the antenna block within the recess, such as by forming a rim or other suitable bent/crimped portion that extends within the recess to secure the cover to the antenna block and/or the rest of the module/assembly.

In some implementations, a sealant, such as a potting compound, may be applied about the cover to define a sealed cover.

In some implementations, the antenna block may further comprise one or more mounting tabs configured for mounting the vehicle RADAR module to a vehicle. In some such implementations, the mounting tab(s) may extend integrally from the antenna block, such as an integral part of a casting forming the antenna block. In some implementations, the cover may be crimped to the antenna block within the recess such that the mounting tab(s) protrude beyond a perimeter of the cover. The mounting tab(s) may comprise one or more locating and/or orientation features to further facilitate proper installation and/or assembly if desired.

Some implementations may further comprise applying a weather seal to the first side of the antenna block. This may be formed by applying an adhesive layer to the upper surface of the assembly. In some embodiments and implementations, a layered, weather seal sub-assembly may be applied to the first/upper side of the antenna block. This sub-assembly may comprise, for example, a layered "sticker" that may include the first conductive adhesive layer, the slotted layer, and a weather seal layer sandwiched together in a self-contained assembly.

Some implementations may further comprise coupling of additional layers, such as additional slotted layers, adhesive layers (such as to the opposite side of the casting, as discussed in greater detail below, or coupling of a PCB layer to the assembly.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
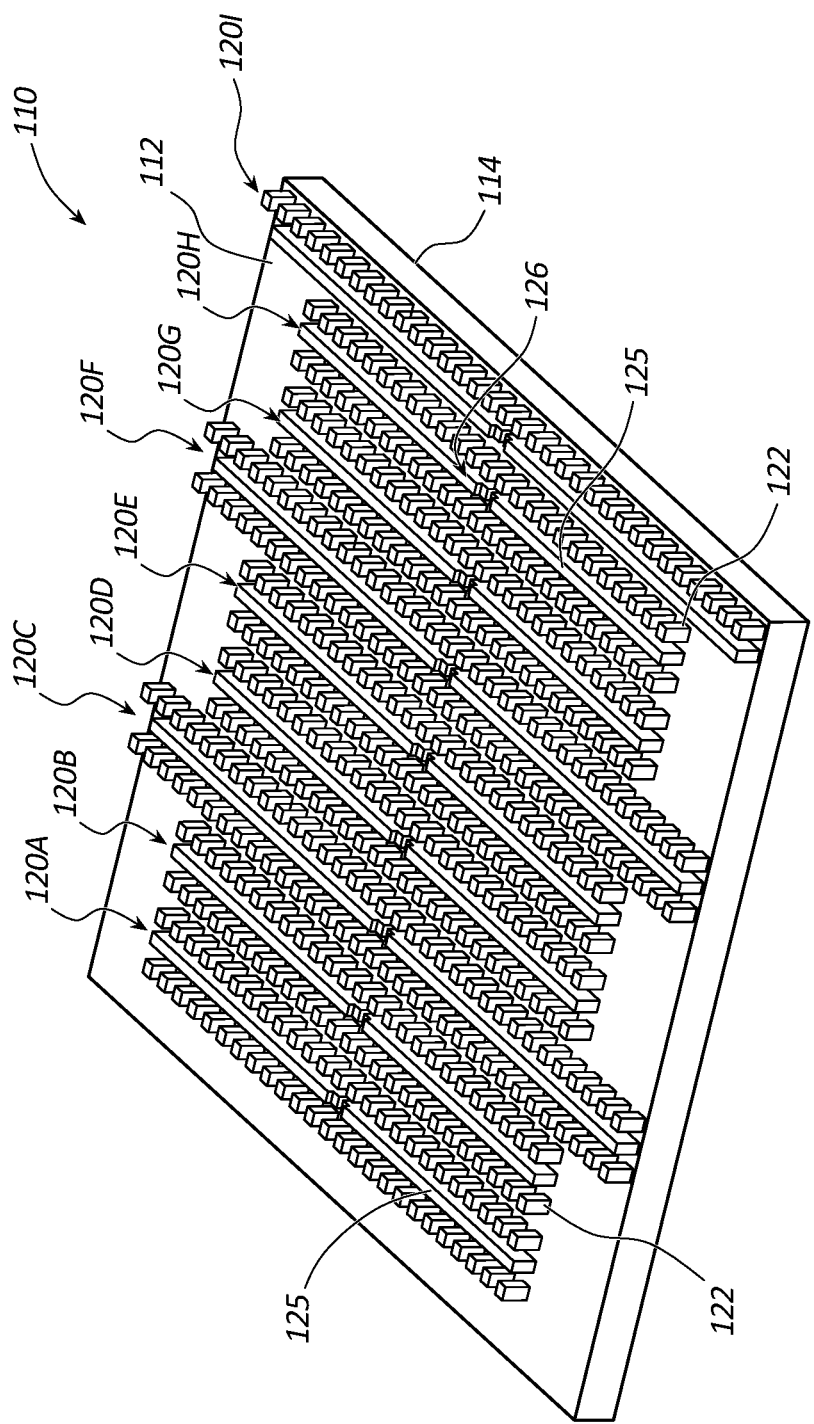
FIG. 1 is a perspective view of an antenna block that may be incorporated into an antenna assembly, such as a vehicle RADAR sensor assembly, according to some embodiments.

FIG. 1 depicts an antenna block 110 that may be incorporated into a vehicle sensor, such as a RADAR sensor assembly, according to some embodiments. Antenna block 110 may define, either in whole or in part, one or more waveguides as part of an antenna array comprising one or more antennae. Thus, as depicted in FIG. 1, antenna block 110 comprises a plurality of posts 122 arranged to define a plurality of waveguide grooves therebetween.

It should be understood that although, in preferred embodiments, a plurality of antennae may be provided and therefore a plurality of corresponding antennae structures—such as a plurality of waveguides, grooves, etc.—may be provided, it is contemplated that some embodiments may comprise an array having a single antenna and therefore only a single waveguide, for example. Such antenna/waveguide/groove may curve about the block/assembly rather than be in a series of parallel lines in some embodiments. As another example, in some embodiments, grooves, slots, or the like may be arranged in a disc formation, or any other suitable formation, including linear, curved, etc.

In the depicted embodiment, each of the grooves is defined by a first plurality of posts 122 extending in a row and a second plurality of posts 122 extending in another row that, in some embodiments, may be parallel to the first plurality of posts 122. Thus, antenna 120A is defined by two parallel rows of posts 122 and antenna 120B is similarly defined by two parallel rows of posts 122, and so on. Antennae 120H and 120I share a common row of posts 122. In other words, three rows of posts 122 define two antennae with the middle row being used to define sides of two separate grooves/antennae.

It should be understood, however, that other grooves and/or antennae, either in the same embodiment or in other embodiments, may not be defined by any posts 122 or other features that are shared in common with other grooves/antennae. For example, as also shown in FIG. 1, antennae 120A-120G are each defined by wholly independent sets of posts 122. It should also be understood that, as described in greater detail below, in preferred embodiments, antennae 120A-120I may be partial antennae. In other words, these antennae may only comprise part of the structure that will ultimately be used to define the full antennae structures used in a functional RADAR or other vehicle sensor assembly and yet will be referred to herein as "antennae" nonetheless.

As also shown in FIG. 1, each of the grooves defined by posts 122 may further comprise a ridge 125 extending through the groove in between the opposing structures defining the groove. Thus, in the depicted embodiment, ridges 125 extend between the opposing posts 122 defining the respective grooves. However, in other embodiments, including some discussed below, grooves may be defined in other ways and/or by other structures, such as simply forming a groove within a solid structure (i.e., no posts extending up from the structure). Although not necessary, ridges 125 may be preferred to enhance the characteristics of the waveguide by further facilitating guidance of electromagnetic waves as desired and/or for satisfying size/dimensional demands.

In some embodiments, including the one depicted in FIG. 1, one or more of the ridges 125 may comprise a notch 126, which may in some embodiments be positioned at a relatively central location between opposing ends of its respective ridge 125 and/or groove. Some embodiments may further comprise a slot or opening that in some embodiments may extend through the entire antenna block 110 from a first side 112 of the antenna block 110 to an opposite side 114. Such slots may be formed in embodiments lacking ridges, and therefore typically lacking notches, and will be discussed in greater detail below and depicted in connection with other embodiments presented below.

As also discussed below, any or all of the waveguide structures discussed above or elsewhere herein may be formed or otherwise disposed on both sides of antenna block 110. Thus, for example, posts 122, ridges 125, and/or grooves may be formed on side 114 as well as, or as an alternative to, side 112.

Figure 2:
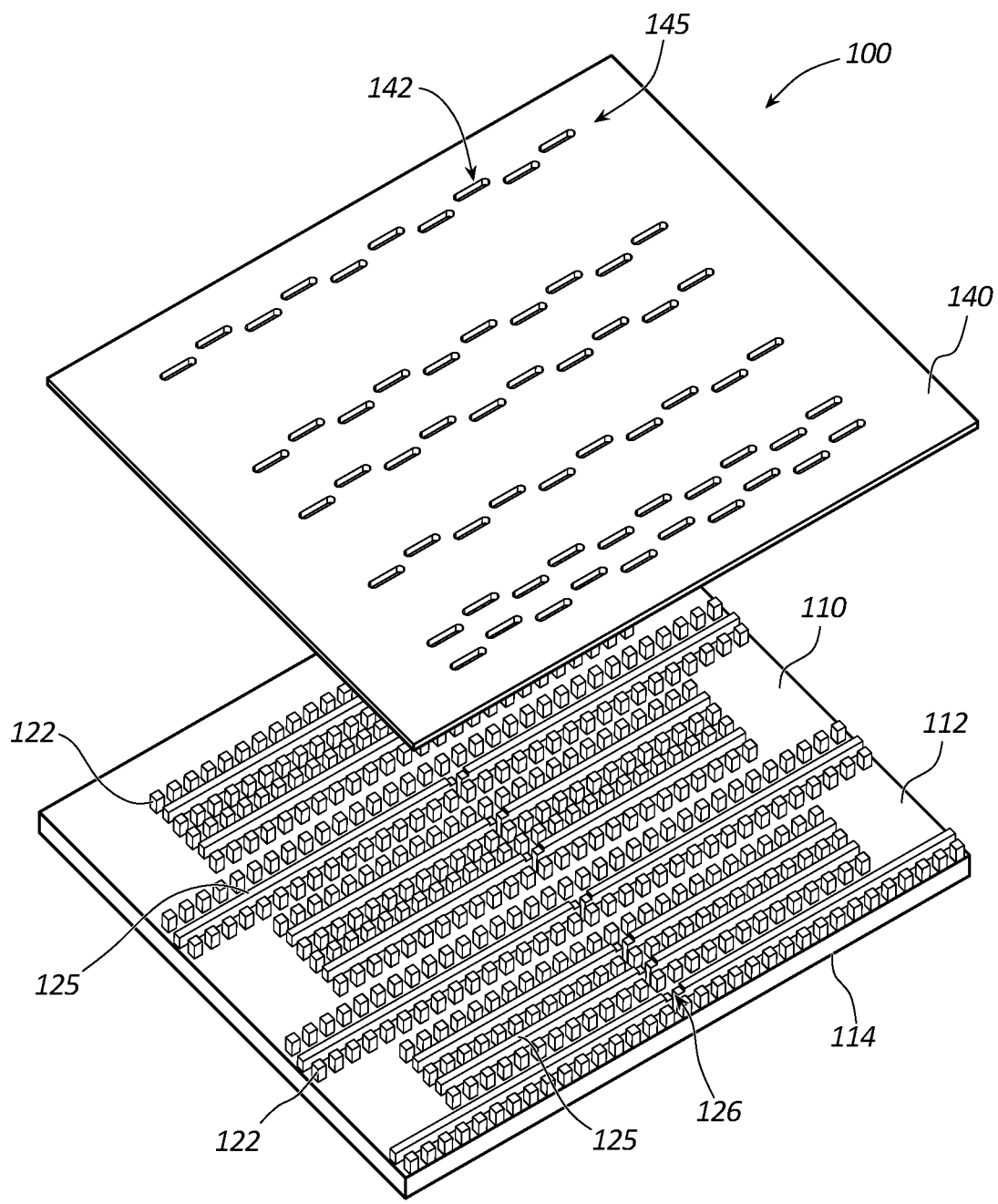
FIG. 2 is an exploded view of the antenna block of FIG. 1 along with a slotted layer that may be coupled with the antenna block to form an antenna assembly.

In preferred embodiments, block 110 may comprise a casting, such as a casting comprising a Zinc or other suitable preferably metal material. However, in other contemplated embodiments, block 110 may comprise a plastic or other material. In some such embodiments, metallic inserts, coatings, or the like may be used if desired. In typical sensor assemblies, which, as previously mentioned, may be configured specifically for use in connection with vehicles, other structures may be combined with block/casting 110. For example, as shown in FIG. 2, a slotted layer 140 may be coupled to the antenna block 140 to form an antenna assembly 100.

Slotted layer 140 of antenna assembly 100 may comprise one or more rows 145 of slots 142, which may correspond in number and/or location with the antennae partially defined by antenna block 140. Thus, layer 140 comprises six rows 145 of slots 142, which may comprise elongated slots, each of which, once layer 140 has been coupled to antenna block 140, is aligned with a respective antenna of the six antennae partially defined by block 140. As also shown in FIG. 2, rows 145 may comprise slots 142 that are staggered with respect to one another.

In some embodiments, this staggering configuration may be applied relative to antenna block 140 such that each slot 142 extends along a side of a groove defined by posts 122 and such that each slot 142 extends along an opposite side of the groove relative to its adjacent slot 142 to facilitate a desired guidance of RF or other electromagnetic radiation though slots 142. However, those of ordinary skill in the art will appreciate that a wide variety of alternative configurations are possible depending upon the desired functionality and specifications of the waveguide/sensor assembly.

Preferably, slotted layer 140 comprises a metal or other conductive material. Layer 140 may be coupled with block 140 in a variety of possible ways. For example, an adhesive, solder, heat stakes, screws, other fasteners, and the like may be used to couple layer 140 to block 110. In some embodiments, as discussed below, another layer, such as a layer of adhesive tape, may be inserted in between layers 110 and 140, which may, either entirely or in part, be used to provide this coupling. In embodiments in which solder is used, such solder may be applied to the top of one or more (in some embodiments, all) of posts 122 and/or ridges 125 (if present).

Figure 3:
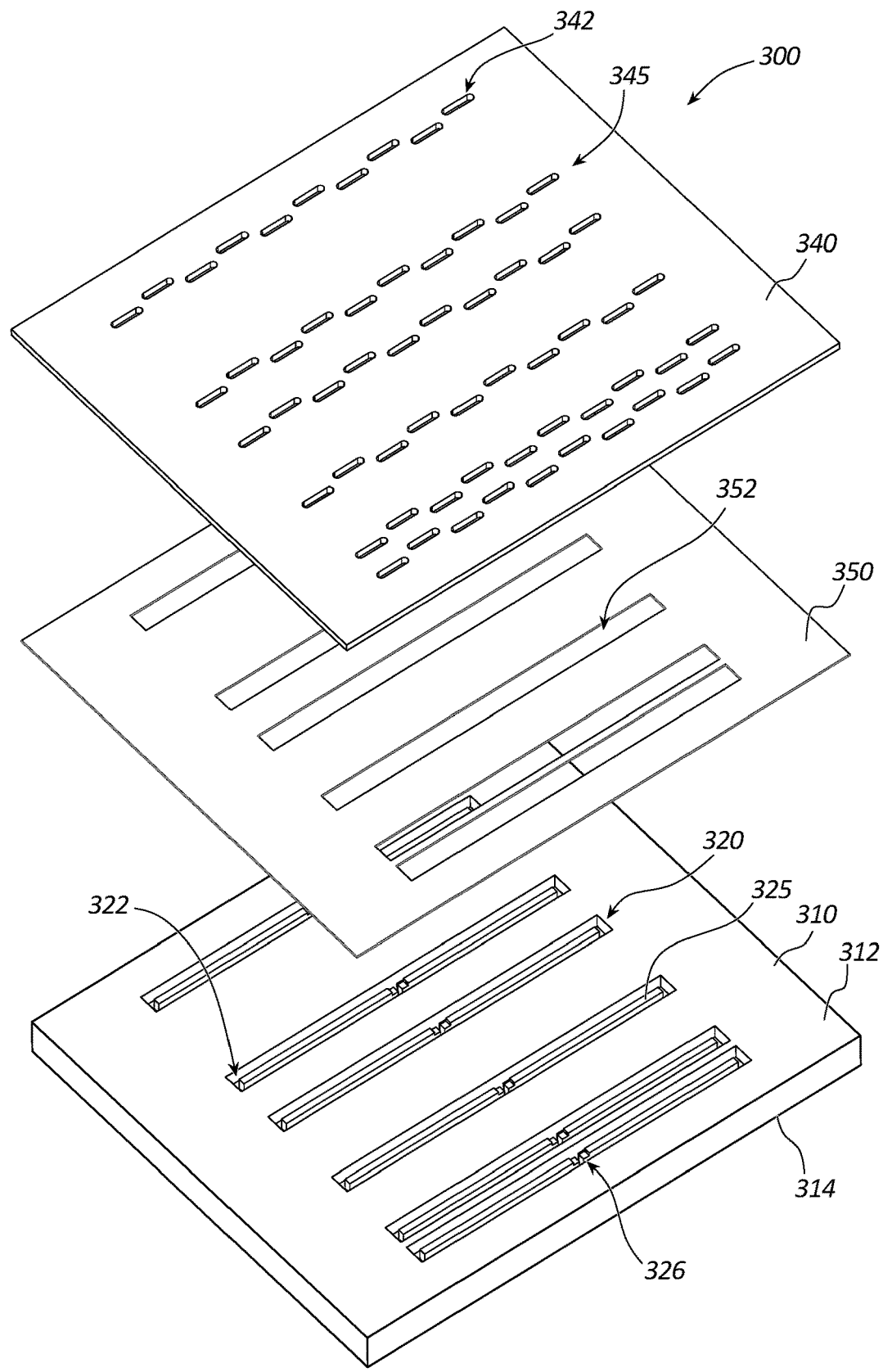
FIG. 3 is an exploded view of an antenna assembly comprising an antenna block, a slotted layer, and an adhesive layer according to other embodiments.
Figure 4:
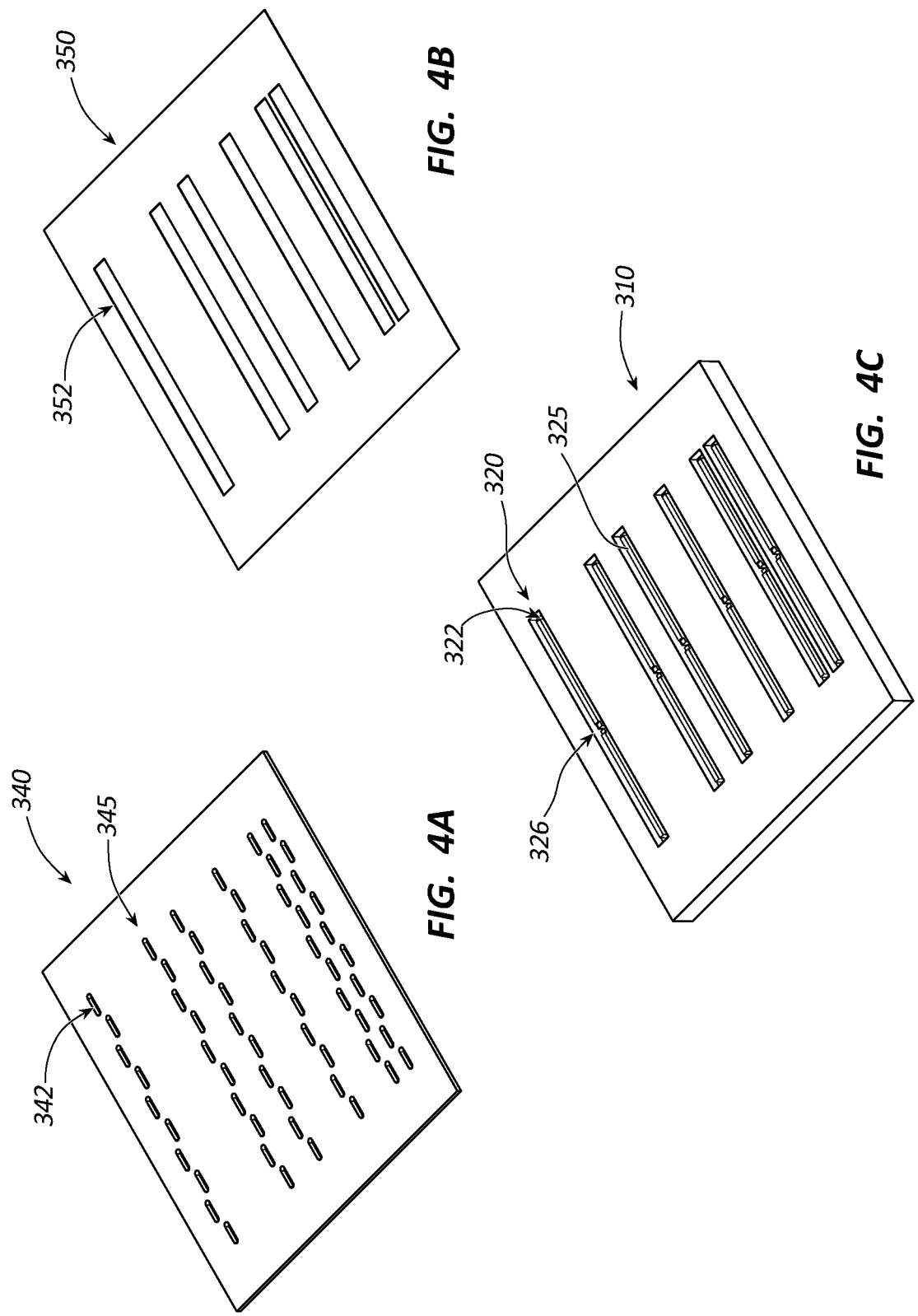
FIG. 4A depicts the slotted layer of the embodiment of FIG. 3.
FIG. 4B depicts the adhesive layer of the embodiment of FIG. 3.
FIG. 4C depicts the antenna block of the embodiment of FIG. 3.

An alternative embodiment of an antenna assembly 300, such as a vehicle RADAR or other vehicle sensor antenna assembly, is shown in FIG. 3, some of the individual layers of which are depicted in FIGS. 4A-4C. Assembly 300 again comprises an antenna block 310, which may comprise a casting in some embodiments. Block 310 comprises a plurality of waveguide grooves 322 used to guide RF or other electromagnetic radiation, as previously mentioned. However, grooves 310 are defined by forming blind openings, such as trenches, within block 310 rather than by providing a series of posts to define one or more grooves therebetween, as with block 110.

Block 310 may otherwise be similar to block 110. Thus, block 310 may comprise an array of antennae structures 320 that may be used to at least partially define a plurality of antennae for a vehicle RADAR or other sensor assembly. In some embodiments, one or more ridges 325 may be positioned within each groove 322 to further define the waveguides as desired. In addition, one or more of such ridges 325 may comprise a notch 326 and/or slot that, in some embodiments, may extend through block 310 from an upper/first surface 312 to a lower/second surface 314, which may allow for desired guidance of RF or other electromagnetic waves from one side of antenna block 310 to the other. As previously mentioned, the antenna structures depicted on surface/side 312 may also be formed on surface/side 314 if desired.

A slotted layer 340 may be coupled to block 310. Slotted layer 340 may be similar to slotted layer 140 and may therefore comprise a plurality of rows 345 of slots 340. Slots 342 may be positioned and configured as desired. However, in the depicted embodiments, slots 342 may be elongated and/or positioned in rows 345 that extend adjacent to a respective groove 322 in a staggered manner as previously described. Preferably, one or more (or each) of slots 342 is positioned adjacent to a respective groove 322 such that the slot 342 is at least partially (in some such embodiments, fully) aligned with the respective groove 322 so that relatively little or none of the groove 322 is blocked by material of the slotted layer 340.

Unlike antenna assembly 100, antenna assembly 300 is shown with a third and/or middle layer positioned in between block 310 and slotted layer 340, namely layer 350. In preferred embodiments, layer 350 comprises an adhesive layer. Adhesive layer 350 may be made up of, for example, an adhesive tape, such as a conductive adhesive tape, or another suitable, preferably conductive material. In other embodiments, adhesive layer 350 may be defined by one or more soldered regions.

As shown in FIG. 3, in preferred embodiments, layer 350 comprises a plurality of openings 352. Openings 352 may correspond in number with and be positioned adjacent to each of the grooves 322 of antennae structures 320. Similarly, each of openings 352 is preferably positioned adjacent to a respective row 345 of slots 342 of layer 340 on the opposite side. Preferably, openings 352 are at least partially (in some cases fully) aligned with grooves 322 and/or slots 342.

Figure 5:
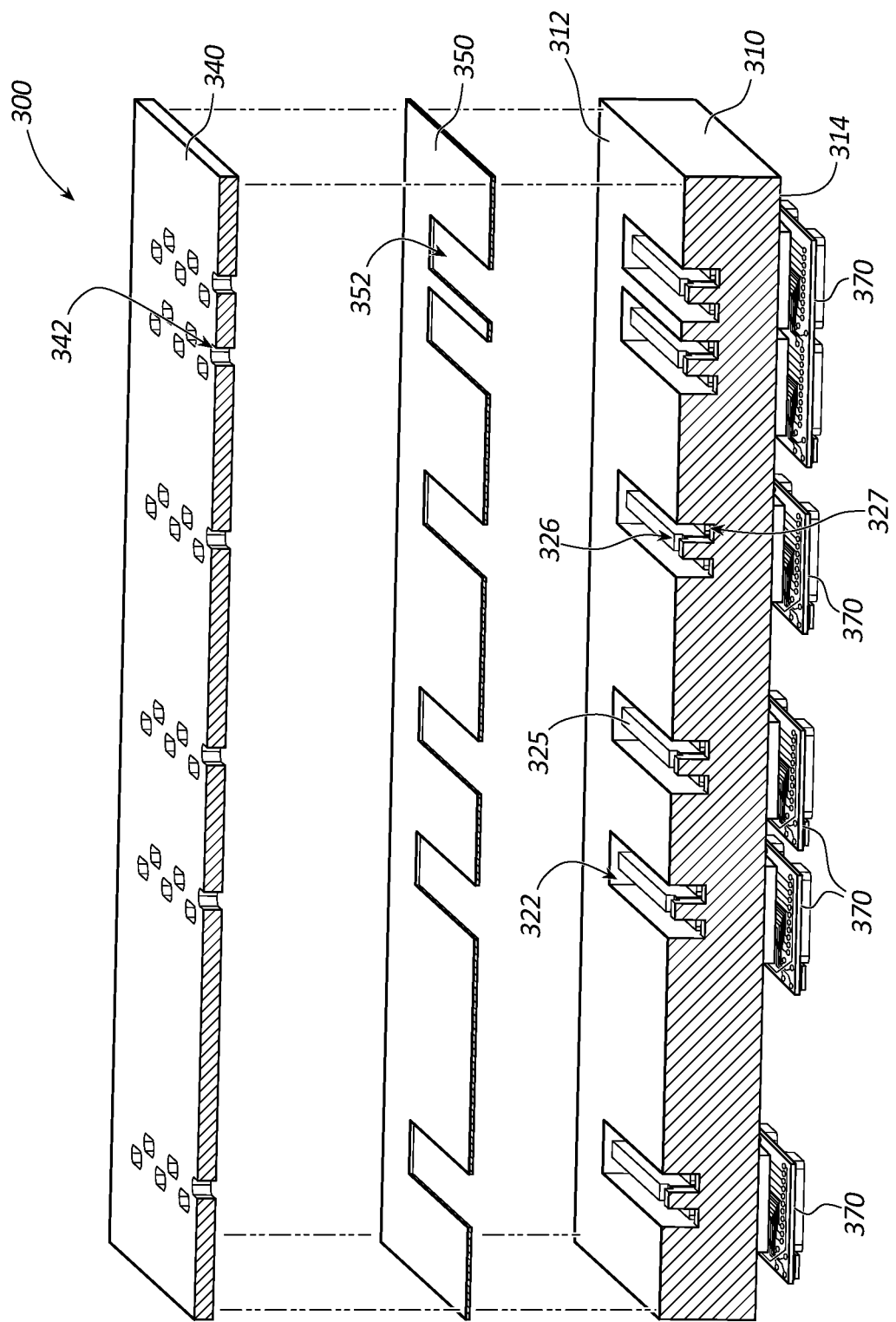
FIG. 5 is an exploded, cross-sectional view of a sensor assembly including each of the layers of FIGS. 4A-4C.

FIG. 5 depicts a cross-sectional view of a more complete example of assembly 300 showing the preferred alignment of each of the various layers and also depicting a PCB layer 370 that may be coupled to surface 314 of block 310. In the depicted embodiment, a series of PCBs 370 are shown, each corresponding with a respective antenna. However, as those of ordinary skill in the art will appreciate, in other embodiments a single PCB may form layer 370 and be used to connect a plurality of antennae. As also best seen in FIG. 5, notches 326 are formed adjacent to a series of slots 327 that may extend through block 310, in some embodiments between sides 312 and 314 of block 310.

In some embodiments, one or more of the PCBs, or a single layer comprising a PCB, may be coupled to block 310 by providing a patch. In some such embodiments, the patch may comprise an array of posts that may, form a partial waveguide so that the PCB and block/casting together may form a waveguide. Alternatively, the posts of this patch may be replaced by continuous walls and/or grooves that may be partially or fully aligned with similar features in the block/casting and/or other layers in the assembly.

Figure 6:
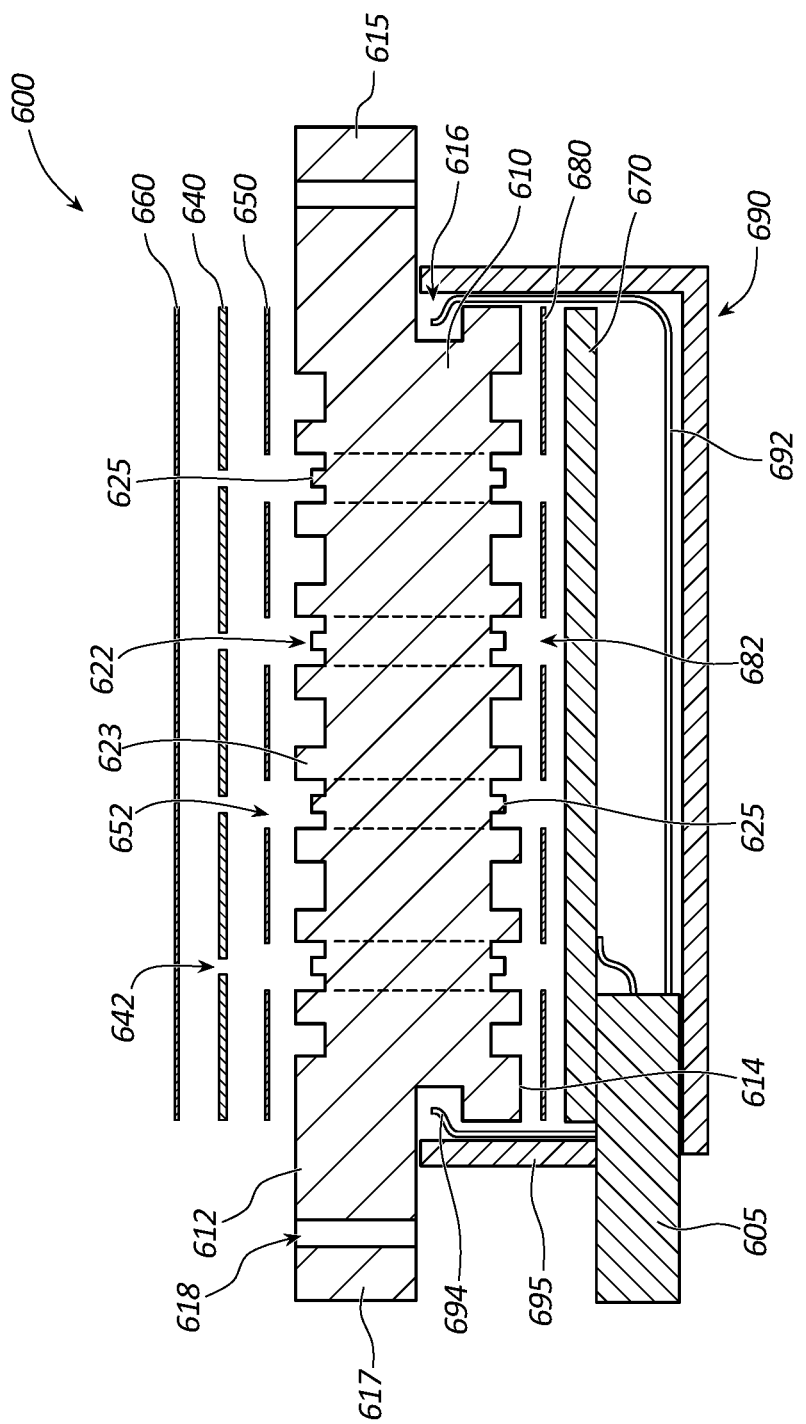
FIG. 6 is a cross-sectional view of a sensor assembly according to still other embodiments.

FIG. 6 is a partially-exploded, cross-sectional view of still another embodiment of a sensor antenna assembly 600. Assembly 600 comprises a number of additional features and components, any one or more of which may be applied to any of the other embodiments discussed herein. Assembly 600 therefore comprises an antenna block 610 that defines a series of structures that are used to partially define individual antennae for a RADAR or other vehicle sensor assembly.

Thus, block 610 comprises a first side 612 defining a first array of waveguide grooves 622 and a second side 614 defining a second array of waveguide grooves 622. Each of the waveguide grooves 622 of side 612 may at least partially overlap with a respective groove 622 of side 614. In some such embodiments, each of the waveguide grooves 622 of side 612 may be aligned with a respective groove 622 of side 614, as shown in FIG. 6. A subset of the grooves 622 of block 610 further comprises a ridge 625 positioned therein. Of course, in other embodiments, all grooves 622 may comprise such a ridge 625 or, alternatively, no such ridges may be provided. For example, rectangular waveguides may be used in some embodiments without ridges. Grooves 622 may be defined by forming a continuous trench within block 610. Alternatively, grooves 622 may be discontinuous, such as by providing a series of adjacent posts 623 or other structures that collectively define a groove, as previously mentioned and depicted in connection with other figures.

As also previously mentioned in connection with other embodiments, various layers may be provided to one or both sides of block 610. Thus, as shown in FIG. 6, layer 650, which may comprise a conductive adhesive layer, such as a conductive tape, may be applied to side 612, preferably such that a series of openings 652 within layer 650 are at least partially aligned, respectively, with grooves 622.

Layer 650 or, in other embodiments, a suitable adhesive, solder, and/or fasteners, may be used to apply layer 640 to antenna block 610. Layer 640 may comprise, for example, a conductive plate that may comprise a plurality of slots 642. Slots 642 may be smaller than the openings 652 of layer 652 if desired and may be used to direct RF signals or the like therethrough. It is also contemplated that any of the disclosed slots may, in alternative embodiments, be sized differently or not provided. For example, in some embodiments, layer 650 may lack slots altogether.

In the embodiment depicted in FIG. 6, still another layer may be applied to antenna block 610. More particularly, assembly 600 further comprises a top layer 660, which may be used to provide a radome or liquid/weather seal to the assembly 600. Thus, in some embodiments, layer 660 may comprise a plastic film or other non-conductive material. In some such embodiments, layer 660 may comprise an adhesive plastic film. However, alternatively, layer 660 may be applied by use of a separate adhesive or other coupling means. Preferably, layer 660 applies a waterproof seal to assembly 600 to protect the unit from damage, which may allow assembly 600 to be mounted to the exterior of a vehicle.

In some embodiments and related manufacturing methods, a sub-assembly comprising a plurality of layers forming a self-contained weather seal or "sticker" may be provided. For example, all three of layers 640, 650, and 660 may be formed during manufacturing in a sandwich configuration that may be simply applied to the top of the antenna block 610 by use of an adhesive. In some such embodiments, the adhesive may be part of the sandwich assembly so that the weather seal assembly may be applied to antenna block 610 similar to a sticker. Of course, in some embodiments, less than all of the layers depicted in FIG. 6 or, in other embodiments, additional layers, may be included in this weather seal/sticker assembly.

To further facilitate such mounting, one or more mounting features may be provided to facilitate mounting or other coupling to a vehicle. For example, the depicted embodiment comprises mounting tabs 615/617. Mounting tabs 615 and 617 may, in some embodiments, comprise integral components of antenna block 610. Thus, in embodiments in which antenna block 610 comprising a casting, mounting tabs 615 may be part of a mold used to manufacture this casting. This may provide simplicity by allowing for formation of mounting features on assembly 610 without requiring separate coupling of such features to the assembly. However, of course, in alternative embodiments mounting tabs and/or features may be separately attached to the assembly 610. It should also be understood that, whereas two opposing mounting tabs 615/617 are shown in the embodiment of FIG. 6, any alternative number of mounting tabs may be used in other embodiments as desired to facilitate a secure coupling with a vehicle.

Both of mounting tabs 615/617 further comprise a mounting feature configured to engage a corresponding mounting feature on a vehicle. In the depicted embodiment, these mounting features comprise openings 618, which may be threaded so as to receive a bolt or other threaded fastener therethrough. However, a wide variety of alternative mounting features are contemplated, including snap-fit prongs, grooves, or other snap-fit coupling elements, mounting brackets, and mounting fasteners or other mounting posts that may be received within a corresponding opening of a vehicle.

On side 614 of antenna block 610, other layers similar to those on side 612 may be provided. Thus, layer 680 may be used to couple a PCB layer 670 to antenna block 610. Layer 680 may be similar to layer 650 and may therefore comprise another conductive tape or other conductive adhesive layer, such as a solder layer. PCB layer 670 may comprise, for example, an FR-4 PCB material, which may form a top of the waveguides defined by antenna block 610 and related structures described above.

Assembly 600 further comprises a cover 690, which may be used to provide additional structure to the assembly and/or to provide a seal to the lower portion of the assembly. In the depicted embodiment, cover 690 comprises a frame 692 that may be used to provide the foundation for enclosing the elements/layers coupled to the lower surface 614 of antenna block 610 and/or provide this seal. Thus, frame 692 of cover 690 is coupled to antenna block 610 such that at least a portion of the antenna block 610 is recessed within cover 690.

In preferred embodiments, and in preferred implementations of methods for manufacturing, cover 690 and, more particularly, frame 692 of cover 690 in even more preferred embodiments and implementations, may be crimped to antenna block 610. More particularly, antenna block 610 may comprise one or more recesses, such as recess 616, within which the cover 690 and/or frame 692 may be crimped or otherwise coupled to antenna block 610. In some embodiments, recess 616 may comprise an annular recess such that cover 690 is crimped to antenna block 610 about a full perimeter of block 610. Following this crimping, rim 694 is formed, which sits within recess 616 to couple cover 690 to the antenna block 610. In some embodiments, frame 692 may comprise an aluminum or other suitable material that preferably may be crimped, bent, molded, such as by forming rim 694, as mentioned.

Cover 690 may further comprise a shell 695, which may define a seal (preferably a water/weatherproof seal) for cover 690. In some embodiments and implementations, shell 695 may comprise a sealant, such as a potting compound or other material that may be applied to the exterior surface of shell, preferably, again, in a manner so as to provide a liquid seal, such as by overmolding shell 695 to the assembly. Thus, in some embodiments, the sealant/overmolding may be applied so as to extend into recess 616 and/or other crevices or other features of the assembly to provide a suitable seal for the intended purpose of the assembly.

As shown in FIG. 6, in some embodiments, mounting tabs 615/617 may protrude beyond a perimeter of cover 690 so as to allow for clearance/spacing to facilitate coupling of assembly 600 with a vehicle.

Various other standard elements may be provided as needed, such as electrical connector 605. Although not shown or described in detail, electrical connector 605, or a cord/wire associated with electrical connector may, in some embodiments, extend through cover 690.

Figure 7:
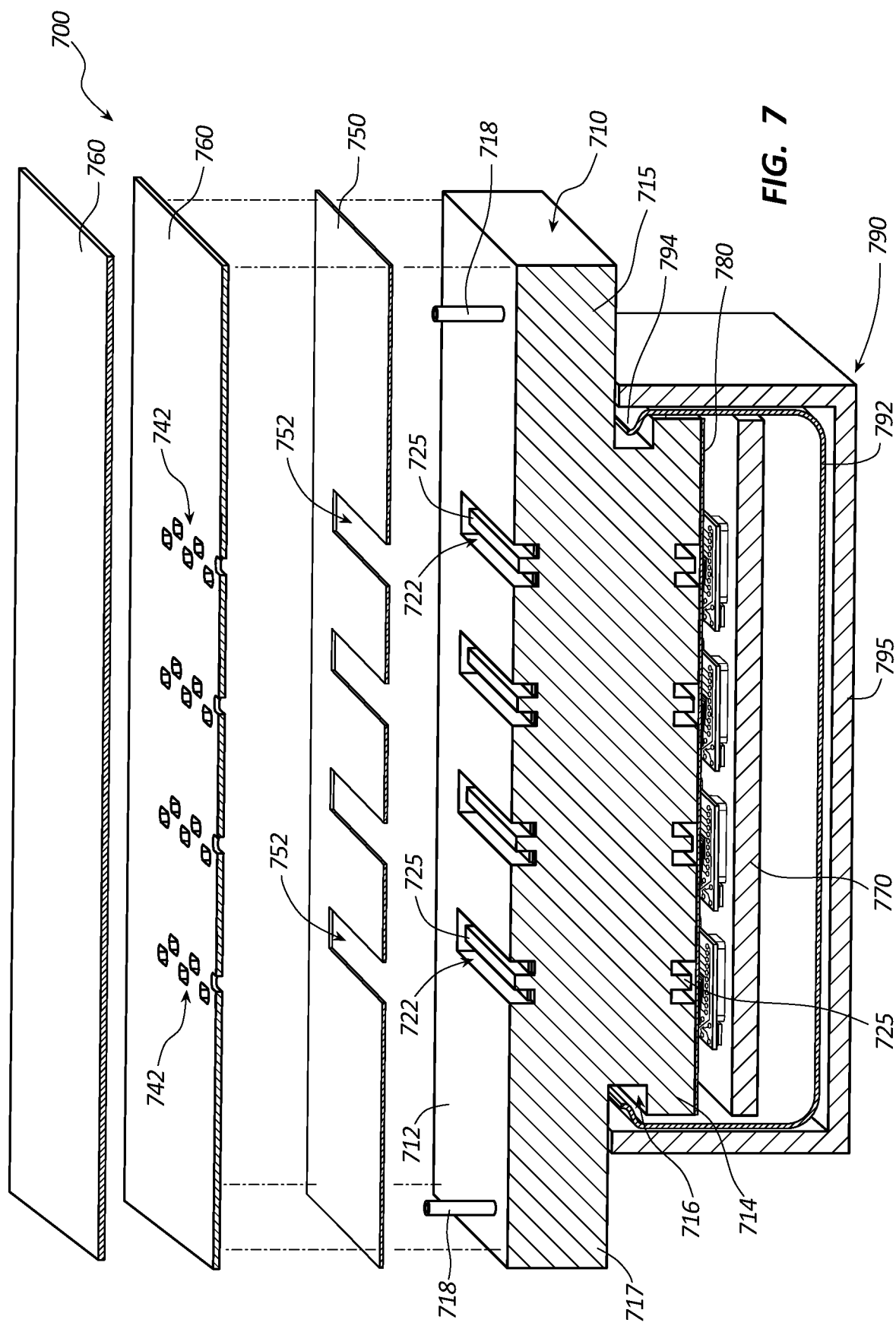
FIG. 7 is an exploded, cross-sectional view of a sensor assembly according to further embodiments.

FIG. 7 depicts a cross-sectional view of yet another example of an antenna assembly 700, such as a vehicle RADAR or other vehicle sensor antenna assembly, according to other embodiments. Assembly 700 comprises an antenna block 710, which may comprise a casting, such as a metallic casting in some embodiments or, alternatively, a thermoplastic casting, for example. Block 710 comprises a plurality of waveguide grooves 722 used to guide RF or other electromagnetic radiation, as previously mentioned. Grooves 710 are defined by forming blind openings, such as trenches, within block 710, as previously mentioned.

Block 710 comprises an array of antennae structures that may be used to at least partially define a plurality of antennae for a vehicle RADAR or other sensor assembly. In some embodiments, one or more ridges 725 may be positioned within each groove 722 to further define the waveguides as desired. Although not shown in FIG. 7, in some embodiments, one or more of such ridges 725 may comprise a notch and/or slot that, in some embodiments, may extend through block 710 from an upper/first surface 712 to a lower/second surface 714, which may allow for desired guidance of RF or other electromagnetic waves from one side of antenna block 710 to the other.

The embodiment of FIG. 7 further comprises a plurality of antennae structures formed on surface/side 714 that are aligned (in alternative embodiments, they may simply overlap to a certain extent or not be aligned at all) with the corresponding antennae structures on surface/side 712.

An upper slotted layer 740 is coupled to block 710 adjacent to side 712. Slotted layer 740 may be similar to slotted layer 140 and may therefore comprise a plurality of rows of slots 740 corresponding to the rows of grooves 722 and/or other antennae structures. A middle layer 750, which may comprise an adhesive layer, is positioned in between block 710 and slotted layer 740. Middle/adhesive layer 750 may be made up of, for example, an adhesive tape, such as a conductive adhesive tape, or another suitable, preferably conductive material. In other embodiments, adhesive layer 750 may be defined by one or more soldered regions.

As also depicted in FIG. 7, in preferred embodiments, layer 750 also comprises a plurality of openings 752. Openings 752 may correspond in number with and be positioned adjacent to each of the grooves 722 of each of the antennae structures. Similarly, each of openings 752 is preferably positioned adjacent to a respective row of slots 742 of layer 740. Preferably, openings 752 are at least partially (in some cases fully) aligned with grooves 722 and/or slots 742.

A top layer 760 may also be applied to antenna block 710, which as previously mentioned, may comprise a plastic film or other non-conductive material. In some such embodiments, layer 760 may comprise an adhesive plastic film. Again, this layer may be used to provide a radome or liquid/weather seal to the assembly 700.

In some embodiments and related manufacturing methods, a sub-assembly comprising a plurality of layers forming a self-contained weather seal or "sticker" may be provided. For example, all three of layers 740, 750, and 760 may be formed during manufacturing in a sandwich configuration that may be simply applied to the top of the antenna block 710 by use of an adhesive. In some such embodiments, the adhesive may be part of the sandwich assembly so that the weather seal assembly may be applied to antenna block 710 similar to a sticker. Of course, in some embodiments, less than all of the layers depicted in FIG. 7 or, in other embodiments, additional layers, may be included in this weather seal/sticker assembly.

Assembly 700 further comprises another layer 780, which may be similar or identical to layer 740, adjacent to side 714. Layer 780 may also comprise a plurality of slots or openings (not visible in FIG. 7) that, again, may correspond in number and/or location with the various antennae structures positioned on this side of block/casting 710.

To facilitate mounting of assembly 700 to a vehicle, one or more mounting features may be provided to facilitate mounting or other coupling to a vehicle. For example, the depicted embodiment comprises mounting tabs 715/717. These mounting may, in some embodiments, comprise integral components of antenna block 710. Mounting tabs 615/617 may further comprise one or more mounting features configured to engage a corresponding mounting feature on a vehicle. In the depicted embodiment, these mounting features comprise posts or studs 718, which may be threaded in some embodiments. However, again, a wide variety of alternative mounting features are contemplated, including threaded holes, snap-fit prongs, grooves, or other snap-fit coupling elements, mounting brackets, and other mounting or other coupling elements.

Assembly 700 further comprises a PCB layer 770 that may be coupled to surface 714 of block 710. PCB layer 770 may comprise, for example, an FR-4 PCB material, which may form a top of the waveguides defined by antenna block 710 and related structures described above. The various components/layers on this side may be enclosed within a casing or cover 790, which may be used to provide additional structure to the assembly and/or to provide a seal to the lower portion of the assembly. In the depicted embodiment, cover 790 comprises a frame 792 that may be used to provide the foundation for enclosing the elements/layers coupled to the lower surface 714 of antenna block 710 and/or provide this seal. Thus, frame 792 of cover 790 is coupled to antenna block 710 such that at least a portion of the antenna block 710 is recessed within cover 790.

In preferred embodiments, and in preferred implementations of methods for manufacturing, cover 790 and, more particularly, frame 792 of cover 790 in even more preferred embodiments and implementations, may be crimped to antenna block 710. More particularly, antenna block 710 may comprise one or more recesses, such as recess 716, within which the cover 790 and/or frame 792 may be crimped or otherwise coupled to antenna block 710.

Following the aforementioned crimping, rim 794 may be formed, which sits within recess 716 to provide a rigid coupling between cover 790 and block 710. In some embodiments, frame 792 may comprise an aluminum or other suitable material that preferably may be crimped, bent, molded, such as by forming rim 794, as mentioned.

Cover 790 may further comprise a shell 795, which may define a seal (preferably a water/weatherproof seal) for cover 790. In some embodiments and implementations, shell 795 may comprise a potting compound or other sealant material that may be applied to the exterior surface of shell, preferably, again, in a manner so as to provide a liquid seal, such as by overmolding shell 795 to the assembly. Thus, in some embodiments, the sealant/overmolding may be applied so as to extend into recess 716 and/or other crevices or other features of the assembly to provide a suitable seal for the intended purpose of the assembly.

Although not shown in the figure, various other standard elements may be provided as needed, such as an electrical connector, cords, wires, receivers, transmitters, or other desired components.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A vehicle RADAR module, comprising:
   an antenna block defining a first array of waveguide grooves on a first side of the antenna block;
   a slotted layer comprising a plurality of slots at least partially aligned with the waveguide grooves of the antenna block;
   an adhesive layer positioned in between the antenna block and the slotted layer;
   a cover coupled to the antenna block such that at least a portion of the antenna block is recessed within the cover; and
   at least one mounting tab configured for mounting the vehicle RADAR module to a vehicle, wherein the at least one mounting tab protrudes from the antenna block defining the first array of waveguide grooves, and wherein the at least one mounting tab comprises an integral portion of the antenna block.

2. The vehicle RADAR module of claim 1, further comprising a second array of waveguide grooves positioned on a second side of the antenna block opposite the first side.

3. The vehicle RADAR module of claim 1, wherein the at least one mounting tab protrudes beyond a perimeter of the cover, wherein the at least one mounting tab comprises a mounting feature configured to engage a corresponding mounting feature on a vehicle, and wherein the mounting feature comprises at least one of a fastener opening, a snap-fit prong, a snap-fit groove, a mounting bracket, and a mounting post.

4. The vehicle RADAR module of claim 1, wherein the antenna block comprises a recess, and wherein the cover comprises a rim engaged within the recess to affix the cover to the antenna block.

5. The vehicle RADAR module of claim 4, wherein the cover is crimped to the antenna block at the recess.

6. The vehicle RADAR module of claim 1, further comprising a plurality of ridges extending within the waveguide grooves.

7. The vehicle RADAR module of claim 1, wherein the first array comprises a plurality of waveguide grooves.

* * * * *